Dec. 12, 1950 J. W. STARBUCK 2,533,295
GAUGE FOR SHIRT COLLARS
Filed Dec. 28, 1945

INVENTOR.
John Wesley Starbuck
BY
William F. Diamond
ATTORNEY

UNITED STATES PATENT OFFICE 2,533,295

GAUGE FOR SHIRT COLLARS

John Wesley Starbuck, New York, N. Y.

Application December 28, 1945, Serial No. 637,759

2 Claims. (Cl. 33—2)

(Granted under the act of March 3, 1883, as amended April 30, 1928; 370 O. G. 757)

The invention described herein, if patented may be manufactured and used by or for the Government for governmental purposes, without the payment to me of any royalty thereon.

This invention relates to an improved template or gage for use in measuring and marking shirt collars and the like.

The invention has for its object to provide a simple and inexpensive device for use by manufacturers, merchants, buyers, inspectors, commercial travelers, and others to enable them to quickly and easily ascertain the standard sizes, and the untrimmed or trimmed standard sizes, and the technical symbol corresponding, or equivalent to that size, of any collar or, preferably, shirt collar, or if not of a standard size or the untrimmed or trimmed standard size, the nearest standard size and the untrimmed or trimmed standard size and the extent to which said collar has been reduced or cut down from the standard size.

Heretofore, the measurement of such collars has been made through the use of measuring tape aligned along the collar length wherein the collar has been pulled taut or stretched, resulting in a great variation in the reading of the tape by various processes seeking such measurement so that the measurement is obtained in a haphazard manner.

As shown, the invention comprises a base of thin material, either metal, wood, cardboard or even paper, upon which certain graduated marks and indicators are ruled, as hereinafter explained; a transparent or opaque sheet of thin material fastened by suitable means upon the base and having a serrated edge describing an arc of approximately 90°, and a round-head wood screw or stud so placed on the base extending above the sheet at a point of origin as to act as a fixed collar button.

The template or gage, as shown by the drawings, is the preferred form, although variations as to form can be made and manufactured to obtain the same result.

Figure 1:
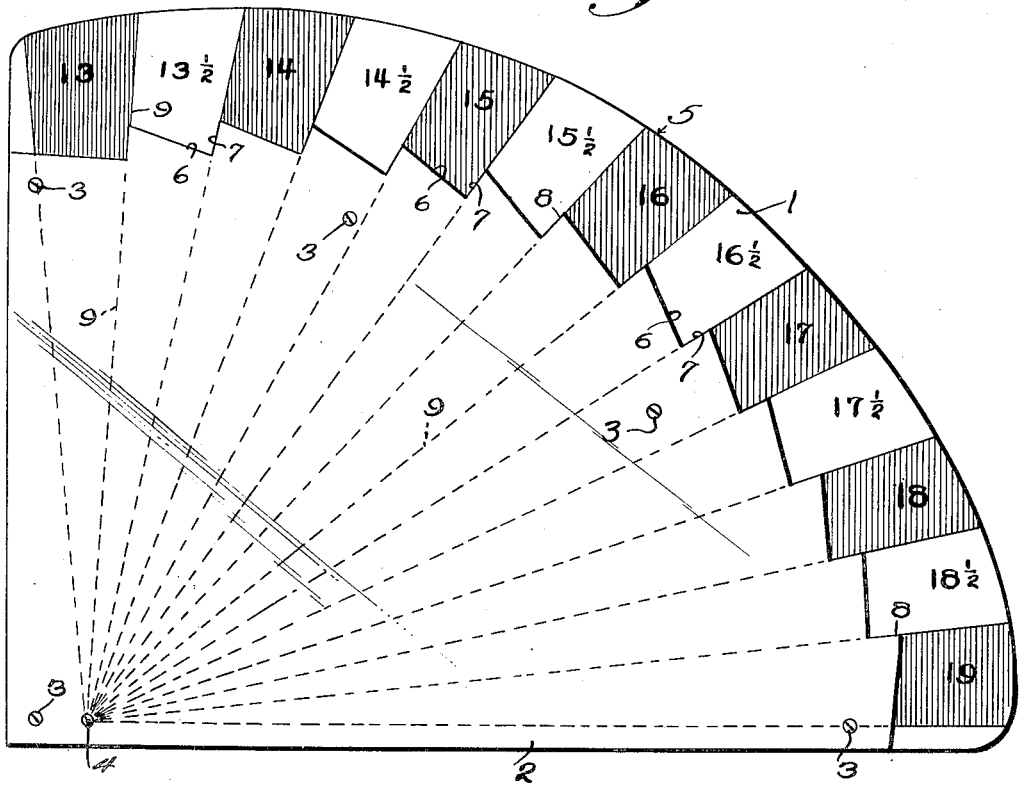
Figure 1 is a top plan view of the described template or gage.
Figure 2:
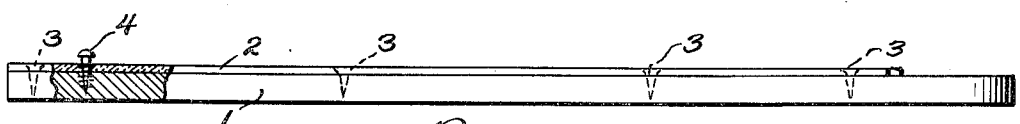
Figure 2 is a view looking up at the bottom of Figure 1, partly broken away.
Figure 3:
Figure 3 is a view looking at the right side of Figure 1.

The template or gage consists of a base 1, preferably of wood or metal, having a sheet 2 thereabove and fastened thereon by suitable means 3, preferably flat-head screws, countersunk so that the heads of the screws do not extend above the surface of the template to prevent snagging of any material coming in contact with such surface (also to prevent sharp metal edges from interfering with the use of the template). The round-head wood screw 4 is positioned on the gage near one corner, as shown in Figure 1, projecting above the upper surface thereof, for a purpose later to be pointed out.

One side 5 of the base 1 is of curved configuration, extending over an arc of approximately 90°. The sheet 2 is three-sided, two sides being straight and slightly longer than the size of a small and a large collar, respectively, and is cut away along the side adjacent to the arcuate edge 5 of the base 1 to form a series of notches having sides or shoulders 6 and 7 and points 8. The sheet 2 may be of transparent material, and together with the base 1, may be marked or colored in any suitable manner to facilitate the distinction between different portions of the gage. Thus, adjoining portions of the base 1 may be painted in several contrasting colors to accentuate the visibility of successive collar sizes represented thereby.

Lines 9 may be marked on the base 1 or traced on the sheet 2 connecting the points 8 of the notches with the point of location of the screw 4, these lines and the notches defining on the instrument portions of different lengths, as measured from the screw 4 to each notch, each portion corresponding to a different collar size. The adjoining portions of the base 1 may be in the form of triangles whose sides are defined by lines 9, and whose bases define the sides 6 of the notches herein. The apices of these triangular portions are located at a common point of origin, which may be the screw or stud 4, and the sides 6 are located along a spiral arcuate line curving around stud 4 and at different distances from the point of origin 4 and arranged preferably in the increasing order of the lengths of the altitudes of the triangles, clockwise about the origin 4, so that the notches, formed by the sides 6 and the contiguous sides of the triangles are likewise arranged in the increasing order of collar sizes about the point of origin 4. Suitable indicia are placed on that portion of the base 1 which forms an extension at a level below the surface of sheet 2, in the space between the bases of the triangular portions just described and the arcuate edge 5 to indicate the collar size to which each of the notches correspond.

The instrument, as described above, may be used for measuring the sizes of attached as well as detachable collars. In using the instrument, the collar to be measured is placed thereon with the screw 4 projecting through the buttonhole therein. The collar is then extended and held under a slight tension while moving the button thereon along the space between the notches in sheet 2 and the arcuate edge 5 of the base 1, until the button engages one of the notch points 8. The size of the collar is then indicated by the number associated with the notch wherein the button has thus been located. The instrument may also be used to determine the sizes of detachable collars not provided with buttons. Such collars are usually provided with a buttonhole at each end and may have a collar button positioned through one buttonhole thereof while the other buttonhole is placed over the screw 4, whereupon by extending the collar over the surface of the sheet 2 under a slight tension and rotating it about the screw 4 as a pivot, until the collar button engages one of the notch points 8, the measurements are made in the same manner as previously described.

The points 8 of the notches are arranged clockwise in the increasing order of their distances from the screw 4 so that the button of a collar measured by the instrument passes beyond the points of all notches, representing smaller sizes than that of the collar, but engages the point of the notch which corresponds to the size of the collar.

It will thus be apparent that the invention provides a gage of simple and rugged construction, having no moving parts to become worn or out of order and capable of being rapidly and easily used for accurate determination of the sizes of collars of all kinds.

Having thus clearly described and illustrated the invention, what is claimed and desired to secure by Letters Patent is:

1. A gage for measuring collars, comprising a flat three-sided plate, one side being straight and slightly longer than the size of a small collar, another side being straight and slightly longer than the size of a large collar, said two sides intersecting at a wide angle, a buttonhole-engaging stud proximate the point of intersection of said two sides, the third side joining the free ends of said first-named two sides and having a series of notches with button-engaging shoulders, said shoulders being arranged along a spiral arcuate line curving around said buttonhole-engaging stud and disposed in a fan-like arrangement and at a progressively increasing distance from said buttonhole-engaging stud, the distance of each notch from said stud being equal to a predetermined standard collar size, and an extension beyond the notched edge of said flat plate, said extension having a top surface below the top surface of said flat plate and carrying a progressive series of collar size numbers in alignment with said series of notches, whereby the size of a collar may be speedily and accurately gaged by engaging its buttonhole with said stud and engaging the collar button in the notch registering with said collar button when said collar is stretched taut over said flat plate.

2. A gage for measuring collars, comprising a base plate, a flat three-sided plate fixedly mounted on said base plate, one edge of said flat plate being straight and slightly longer than the size of a small collar, another side being straight and slightly longer than the size of a large collar, said two sides intersecting at a wide angle, a buttonhole-engaging stud proximate the point of intersection of said two sides, the third side joining the free ends of said first-named two sides and having a series of notches with button-engaging shoulders, said shoulders being arranged along a spiral arcuate line curving around said buttonhole-engaging stud and disposed in a fan-like arrangement and at a progressively increasing distance from said buttonhole-engaging stud, the distance of each notch from said stud being equal to a predetermined standard collar size, said base plate extending beyond the notched edge of said flat plate, the extending portion having a top surface below the top surface of said flat plate and carrying a progressive series of collar size numbers in alignment with said series of notches, whereby the size of a collar may be speedily and accurately gaged by engaging its buttonhole with said stud and engaging the collar button in the notch registering with said collar button when said collar is stretched taut over said flat plate.

JOHN WESLEY STARBUCK.

REFERENCES CITED

The following references are of record in the file of this patent:

UNITED STATES PATENTS

| Number | Name | Date |
|---|---|---|
| 741,146 | Labofish | Oct. 13, 1903 |
| 802,402 | Martin | Oct. 24, 1905 |
| 926,688 | Carroll | June 29, 1909 |
| 1,985,199 | Bliss | Dec. 18, 1934 |
| 2,127,443 | Duncon et al. | Aug. 16, 1938 |